May 20, 1969   J. G. ARCENEAUX, SR   3,444,913
SUGAR CANE PLANTER
Filed May 27, 1966

James G. Arceneaux, Sr.
INVENTOR.

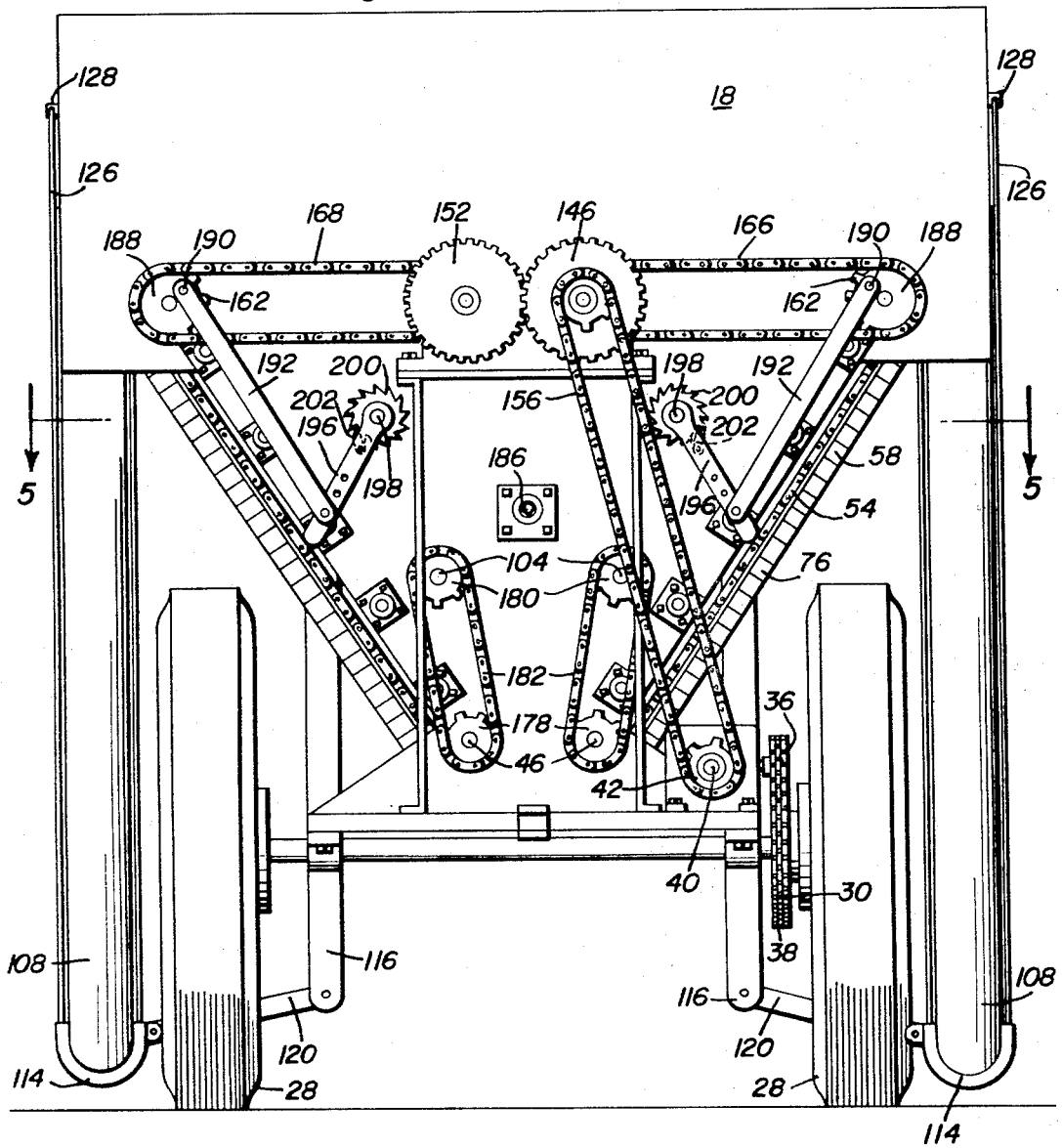

May 20, 1969 J. G. ARCENEAUX, SR 3,444,913
SUGAR CANE PLANTER
Filed May 27, 1966

James G. Arceneaux, Sr.
INVENTOR.

James G. Arceneaux, Sr.
INVENTOR.

May 20, 1969   J. G. ARCENEAUX, SR   3,444,913
SUGAR CANE PLANTER

James G. Arceneaux, Sr.
INVENTOR

James G. Arceneaux, Sr.
INVENTOR.

United States Patent Office 3,444,913
Patented May 20, 1969

3,444,913
SUGAR CANE PLANTER
James G. Arceneaux, Sr., Rte. 1, Box 138,
Port Allen, La. 70767
Filed May 27, 1966, Ser. No. 553,444
Int. Cl. A01d *55/18;* B02c *13/00*
U.S. Cl. 146—98                          20 Claims

ABSTRACT OF THE DISCLOSURE

An upwardly opening receptacle for receiving cane stalks therein and including downwardly convergent lower sidewall portions defining a downwardly opening throat area therebetween. The receptacle includes cutting means operable to cut stalks advanced downwardly through the throat area and conveying means operable to engage and intermittently advance groups of stalks disposed in the lower portion of the receptacle downwardly through the throat area and into registry with and for cutting by the cutting means.

---

This invention relates to a novel and useful stalk processing machine and more specifically to a mobile machine defining a receptacle adapted to receive sugar cane stalks.

The processing machine of the instant invention includes an outlet throat for the receptacle portion thereof and means for conveying the sugar cane stalks from within the receptacle portion outwardly of the throat. Further, the throat of the receptacle includes a plurality of cutting means with at least portions thereof disposed in the throat and operative, upon movement of sugar cane stalks through the throat, to cut the sugar cane stalks into predetermined lengths. Still further, the discharge throat of the receptacle includes additional conveyor means adapted to frictionally engage the cut sections of sugar cane stalks being discharged from the throat of the receptacle and to convey these cut sections to discharge chute means adapted to receive the cut sections and convey them downwardly toward the ground over which the receptacle is moving in a manner such that the cut sections or lengths of stalks may be discharged into open rows along which the receptacle is being moved.

The stalk processing machine of the instant invention comprises an improvement over the sugar cane planter disclosed in my prior U.S. Patent No. 2,841,103 dated July 1, 1958. The improvements of the instant invention reside in the handling of the sugar cane stalks to be cut during their movement from the receptacle portion of the machine downwardly through the discharge throat of the machine while the stalks are being cut into predetermined lengths and also in means by which the cut lengths of sugar cane stalks are extracted from the throat of the receptacle after being cut and the manner in which the cut stalks are individually ejected from the cutting station toward a conveyor pickup station for subsequent engagement by an associated conveyor.

In addition to also having as objects those objects set forth in my above mentioned prior patent, the stalk processing machine of the instant invention has as its main object to provide a cane processing machine such as that disclosed in my above prior patent with improved means for intermittently frictionally engaging and advancing sugar cane stalks into the area of the throat of the machine where the cutting operation of the cane stalks is carried out.

Another object of this invention, in accordance with the immediately preceding object, is to provide sugar cane engaging and advancing means operable to convey the sugar cane stalks through the cutting area at least until such time as the stalks are cut into individual lengths or sections.

A further object of this invention is to provide means operative to engage the cut lengths or sections of sugar cane stalks and convey the sections to a discharge area for engagement by a conveyor assembly adapted to individually convey the cut sections to the upper end of a planting chute.

A final object of this invention to be specifically enumerated herein is to provide a stalk processing machine and planter in accordance with the preceding object and which will conform to conventional forms of manufacture, be of simple construction and automatic in operation so as to provide a device that will be economically feasible, long lasting and relatively trouble free.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 2 is a front elevational view of the machine illustrated on somewhat of an enlarged scale;

FIGURE 7 is a fragmentary transverse vertical sectional view taken upon a plane spaced laterally from the plane on which FIGURE 4 is taken and illustrating the drive mechanism of the stalk advancing assembly of FIGURE 4;

Figure 1:
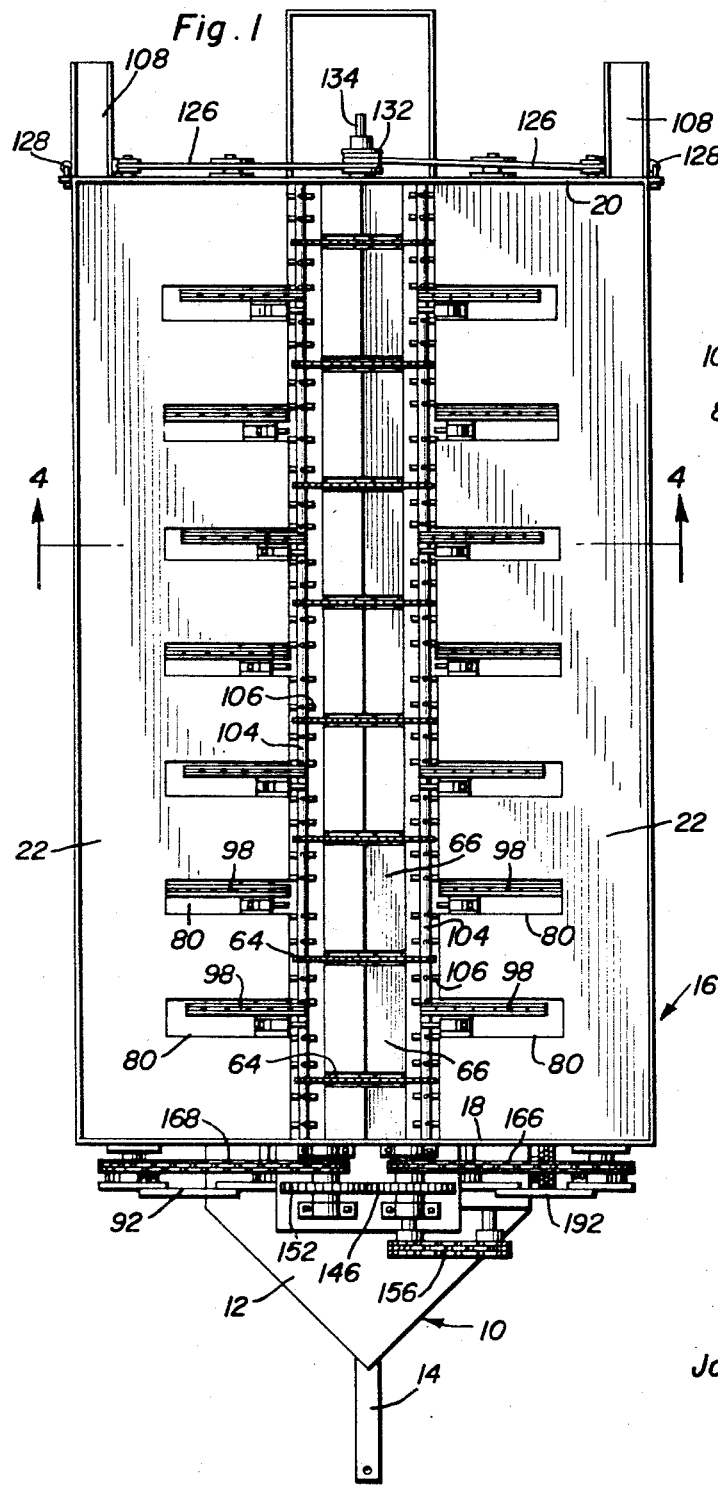
FIGURE 1 is a top plan view of the stalk processing machine or planter of the instant invention.
Figure 7:
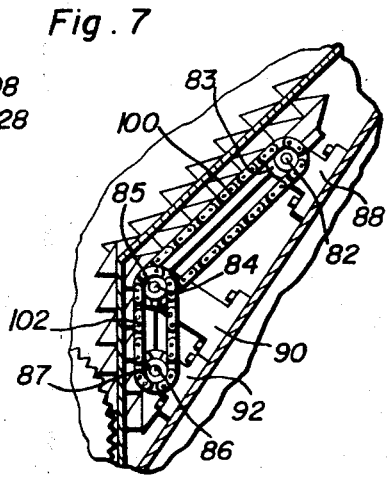

Referring now more specificaly to the drawings the numeral 10 generally designates the stalk processing machine of the instant invention which includes a frame 12 adapted to be towed behind a draft vehicle by means of a forwardly projecting tongue 14. The machine 10 includes a hopper-like receptacle generally referred to by the reference numeral 16 and supported from the frame 12 in any convenient manner and which includes front and rear walls 18 and 20 and downwardly convergent opposite side walls 22 spaced apart at their lower ends and provided with downwardly directed extensions 24 defining a throat 26 therebetween.

A plurality of ground engaging wheels 28 are journalled from the frame 12 and one of the wheels 28 has a drive sprocket 30 mounted thereon for rotation therewith. The sprocket 30 is drivingly coupled to the input shaft 32 of a gear reduction unit generally referred to by the reference numeral 34 by means of a sprocket wheel 36 mounted on the shaft 32 for rotation therewith and an endless chain 38 entrained over the sprocket wheels 30 and 36. The gear reduction unit includes a power output shaft 40 having a sprocket wheel 42 mounted thereon and which will be referred to more specifically hereinafter.

Two pairs of upper and lower shafts 44 and 46 extend between and are rotatably supported from the end walls 18 and 20. The shafts 44 and 46 on each side of the centerline of the receptacle 16 define portions of opposite side stalk section conveying assemblies generally referred to by the reference numerals 48. Each of the assemblies 48 includes a pair of sprocket wheels 50 and 52 mounted on the opposite ends of the corresponding shafts 44 and 46, respectively, and an endless flexible chain 54 is entrained over each pair of sprocket wheels 50 and 52. A flexible endless sheet 56 is provided and secured to each pair of chains 54 and a plurality of elongated straps or slats 58 are secured to and extend transversely of each flexible sheet 56. The slats 58 are disposed in groups of closely adjacent straps separated at points spaced about the corresponding endless sheet 56 such as at points 60 defining pockets or omitted areas of the slats 58 in which cut sections of sugar cane may be received.

The slats 58 do not extend the full width of the sheet 56 but instead are arranged in laterally aligned rows of slats 58 extending about the sheet 56. The pockets 60 in each row of slats 58 extending about the panel 56 are staggered longitudinally of the panel 56 relative to the pockets 60 in the adjacent rows of slats 58.

A circular saw supporting shaft 62 is centrally disposed in the throat 26 intermediate its upper and lower ends and is journalled from the end walls 18 and 20. The shaft 62 supports a plurality of circular saw blades 64 thereon for rotation therewith and the spacing between adjacent saw blades 64 and the endmost saw blades 64 and the end walls 18 and 20 defines zones in which cut sections of stalk may be received and with which a row of corresponding slats 58 is aligned.

The throat 26 also has centrally disposed therein a divider 66 including an upper portion which is inverted V-shaped in configuration and includes a pair of downwardly divergent sides 68 extending downwardly from an apex 70 toward convergent lower end portions 72 forming a lower apex 74. The lower end portions 72 closely overlie the lower end portions of the inner reaches 76 of the conveyor assemblies 48 defining areas 78 between the lower ends of the downwardly directed portions 24 and the lower ends of the downwardly divergent sides 68 in which cut sections of stalks may be discharged and retained momentarily until received in the next pocket 60 of the row of slats 58 to pass by the area 78.

The sides or side walls 22 have slots 80 formed therein including extensions 81 thereof in the corresponding downwardly directed portions 24. The slots 80 are spaced longitudinally of the receptacle 16 and are substantially centered with respect to the center of each area defined between a pair of adjacent circular saw blades 64.

Each side of the receptacle 16 includes three crankshafts 82, 84 and 86 which extend between the opposite end walls 18 and 20 and are journalled from the end walls 18 and 20 and also by means of journal blocks 88, 90 and 92, respectively, supported from the corresponding side or side wall 22. The crankshafts 82, 84 and 86 include eccentric throws 82', 84' and 86' and the throws 82' have one set of upper ends of upper elongated conveyor bars 94 journalled thereon while the throws 86' have a set of corresponding lower ends of a plurality of conveyor bars 96 journalled thereon. The lower ends of the conveyor bars 94 and the upper ends of the conveyor bars 96 are journalled in side-by-side relation on the throws 84' which are approximately twice the axial length of the throws 82' and 86'.

The conveyor bars 94 and 96 include teeth 98 spaced longitudinally therealong which are operable through the slot 80 registered with each pair of bars 94 and 96. The shafts 82, 84 and 86 have sprocket wheels 83, 85 and 87, respectively mounted thereon and are drivingly connected to each other by means of endless chains 100 and 102. Accordingly, upon rotation of the crankshafts 82, 84 and 86 which are intermittently advanced in rotation, the conveyor bars 94 and 96 will be operative to advance sugar cane stalks disposed within the receptacle 16 downwardly along the sides of side walls 22 thereof and then downwardly through the throat 26 and between the saw blades 64. Of course, the conveyor bars 94 and 96 operate in a manner to intermittently advance the sugar cane stalks to be cut.

Figure 8:
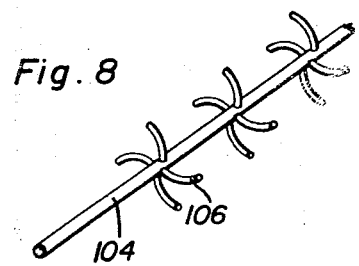
FIGURE 8 is a fragmentary perspective view of one of the fingered rotatable shafts by which the cut stalks are ejected from the throat of the receptacle downwardly toward the associated conveyor.
Figure 3:
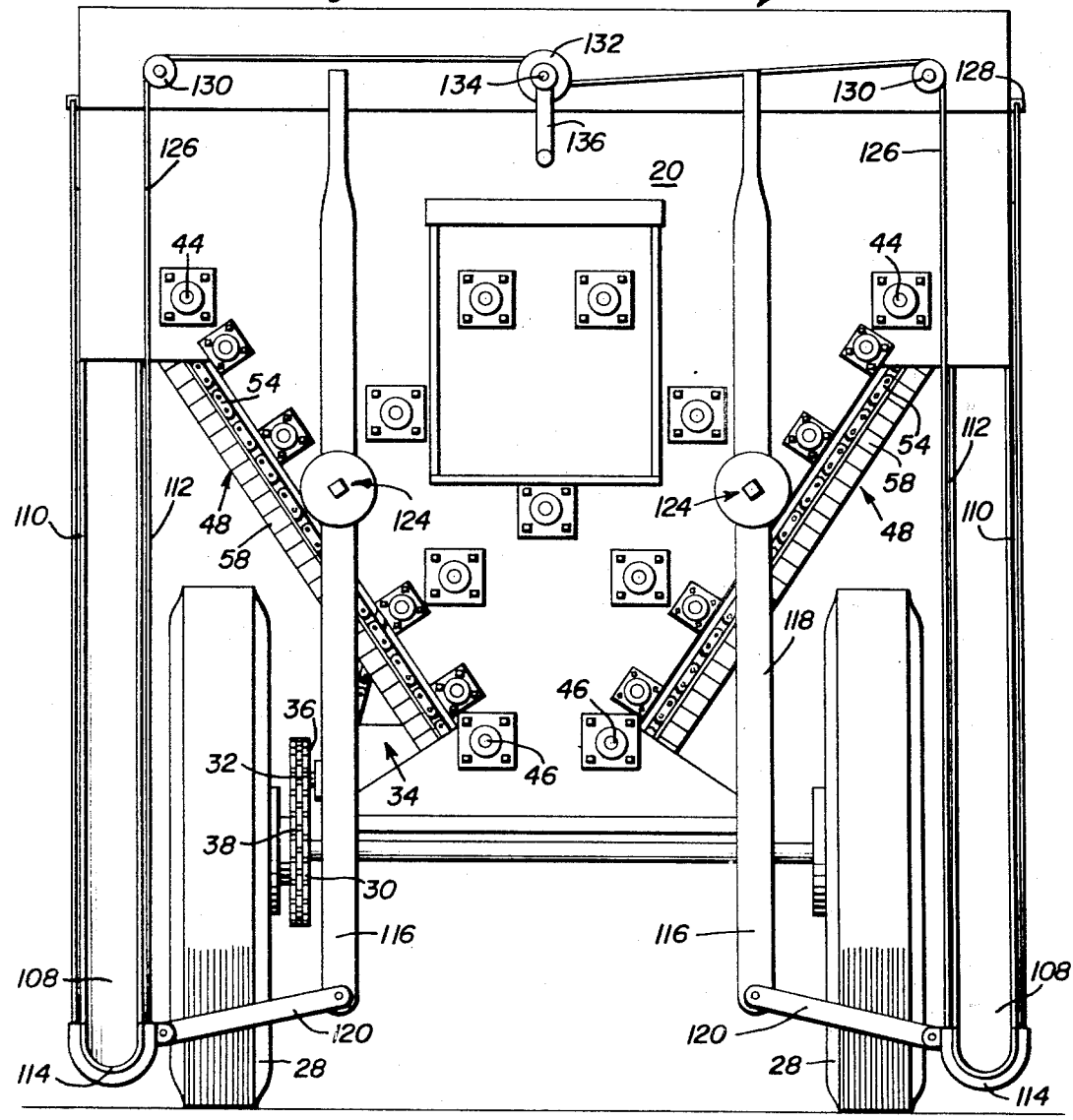
FIGURE 3 is a rear elevational view of the machine illustrated on the same enlarged scale.
Figure 4:
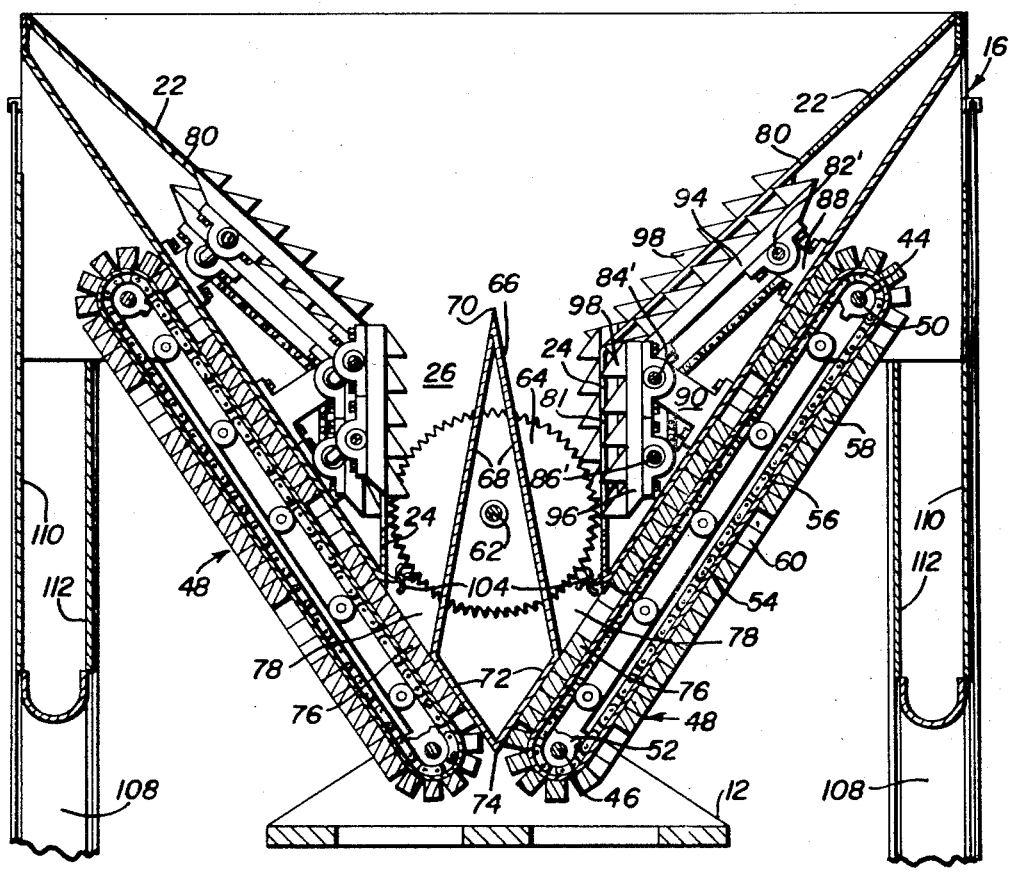
FIGURE 4 is a vertical transverse sectional view taken substantially upon the plane indicated by the section line 4—4 of FIGURE 1 and on somewhat of an enlarged scale.

Also journalled between the end walls 18 and 20 are a pair of shafts 104 including longitudinally spaced groups of generally radially outwardly projecting fingers 106, see FIGURE 8. The shafts 104 are disposed in the areas 78 and the fingers 106 are adapted to engage and extract cut sections of sugar cane stalks from between adjacent saw blades 64. By ejecting the cut sections of sugar cane stalks downwardly toward the lower ends of the areas 78, the cut sections of stalk rest upon the slats 58 passing the lowermost extremities of the areas 78 until one of the pockets or recesses 60 is registered with the lower end of the area 78 at which time the cut section of sugar cane will fall into the pockets 60 and be conveyed upwardly to the upper end of the associated conveyor assembly for discharge into the rearwardly and downwardly inclined troughs 108 supported on opposite sides of the recepticle 16.

The receptacle 16 includes a pair of free hanging canvas curtains 110 and 112 on each side thereof which support the corresponding trough 108. In addition, the lower end of each trough 108 has a cradle support 114 secured thereto in any convenient manner and each cradle support 114 is operatively connected to the lower end portion 116 of a corresponding positioning lever 118 by means of a link 120 pivotally connected between the positioning lever and the cradle support. The positioning levers 118 are each pivotally supported from the rear wall 20 of the receptacle 16 by means of an adjustable friction pivot assembly generally referred to by the reference numeral 124 and each cradle support 114 defines a U-shaped passage through which the midportion of a corresponding elongated and flexible support member 126 is slidably received. One end portion of each support member 26 is secured to the receptacle 16 as at 128 and the support members 126 pass over a pulley wheel 130 supported from the rear wall 20 on the corresponding side of the receptacle 16 and is secured to a winding member 132 journalled on an axle portion 134 projecting rearwardly of the rear wall 20. In addition, the winding member 132 includes a crank handle 136 and suitable lock means (not shown) for retaining the winding member 132 in adjusted rotated position. Therefore, it may be seen that the lower ends of the chutes 108 may be laterally adjusted by means of the positioning levers 118 and that the lower ends of the chutes 108 may be adjusted in height by means of the winding member 132.

Figure 6:
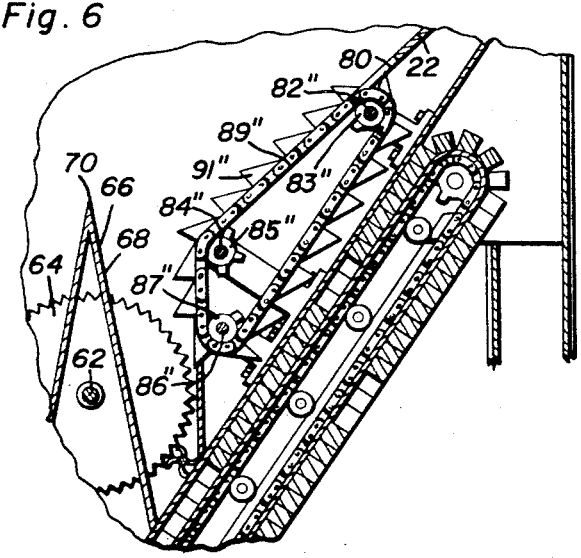
FIGURE 6 is a fragmentary transverse vertical sectional view similar to the upper right hand portion of FIGURE 4 but showing a modified form of stalk engaging and advancing mechanism.
Figure 5:
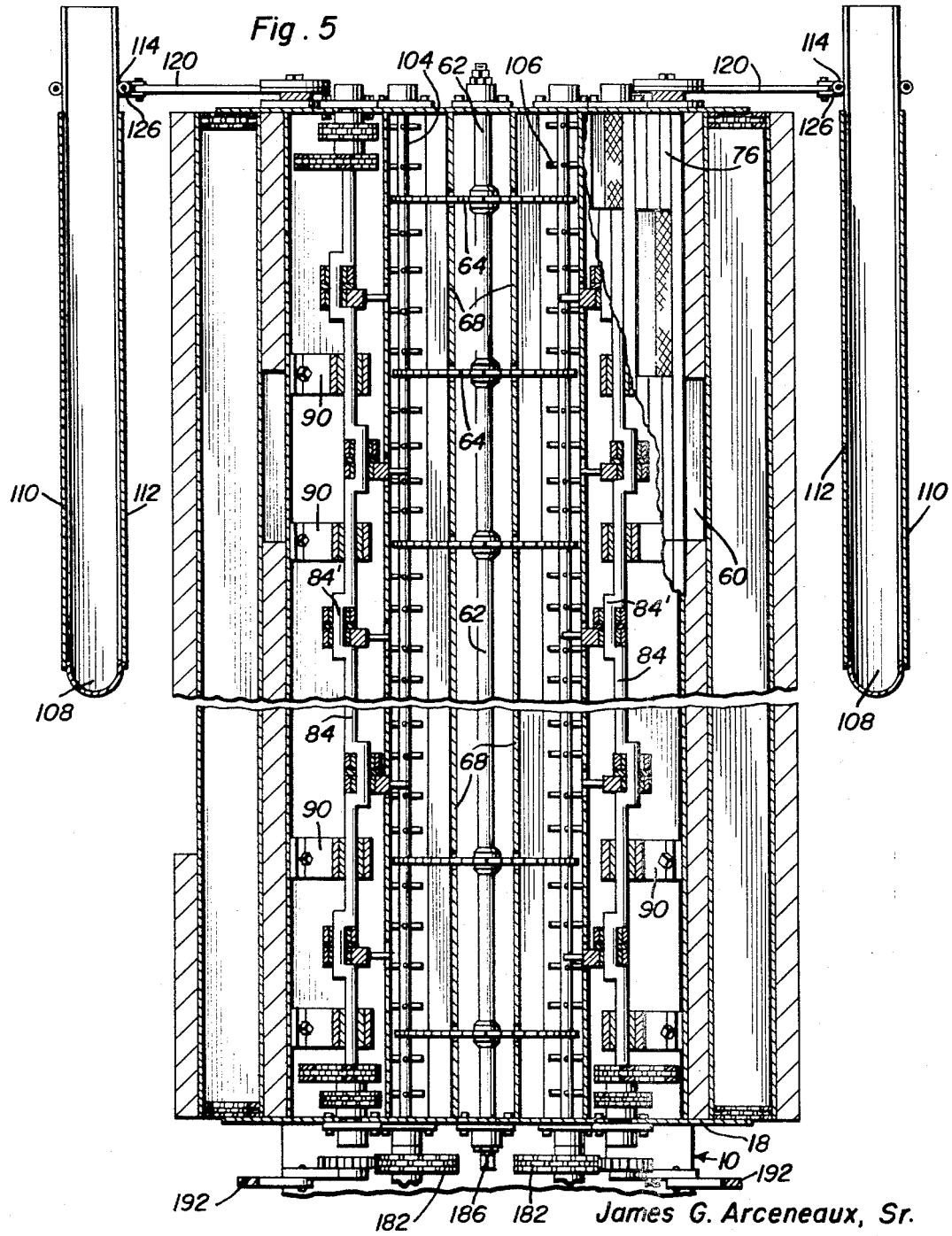
FIGURE 5 is a horizontal sectional view taken substantially upon the plane indicated by the section line 5—5 of FIGURE 2.

With attention now invited more specifically to FIGURE 6 of the drawings there may be seen a modified form of conveying means for frictionally engaging and advancing the stalks downwardly through the throat 26. The modified conveying means includes shafts 82", 84" and 86" corresponding to the shafts 82, 84 and 86. The shafts of the modified form of conveying means are, however, not crankshafts but straight shafts having sprocket wheels 83", 85" and 87" mounted thereon for rotation therewith with each set of sprocket wheels 83", 85" and 87" aligned with a corresponding slot 80 and having an endless chain 89" entrained thereabout and provided with outwardly projecting tooth-like projections 91". The endless chains 89" are disposed at each location defined by one of the slots 80 whereas the sprocket wheels 83, 85 and 87 are disposed at opposite ends of the shafts 82, 84 and 86.

Figure 9:
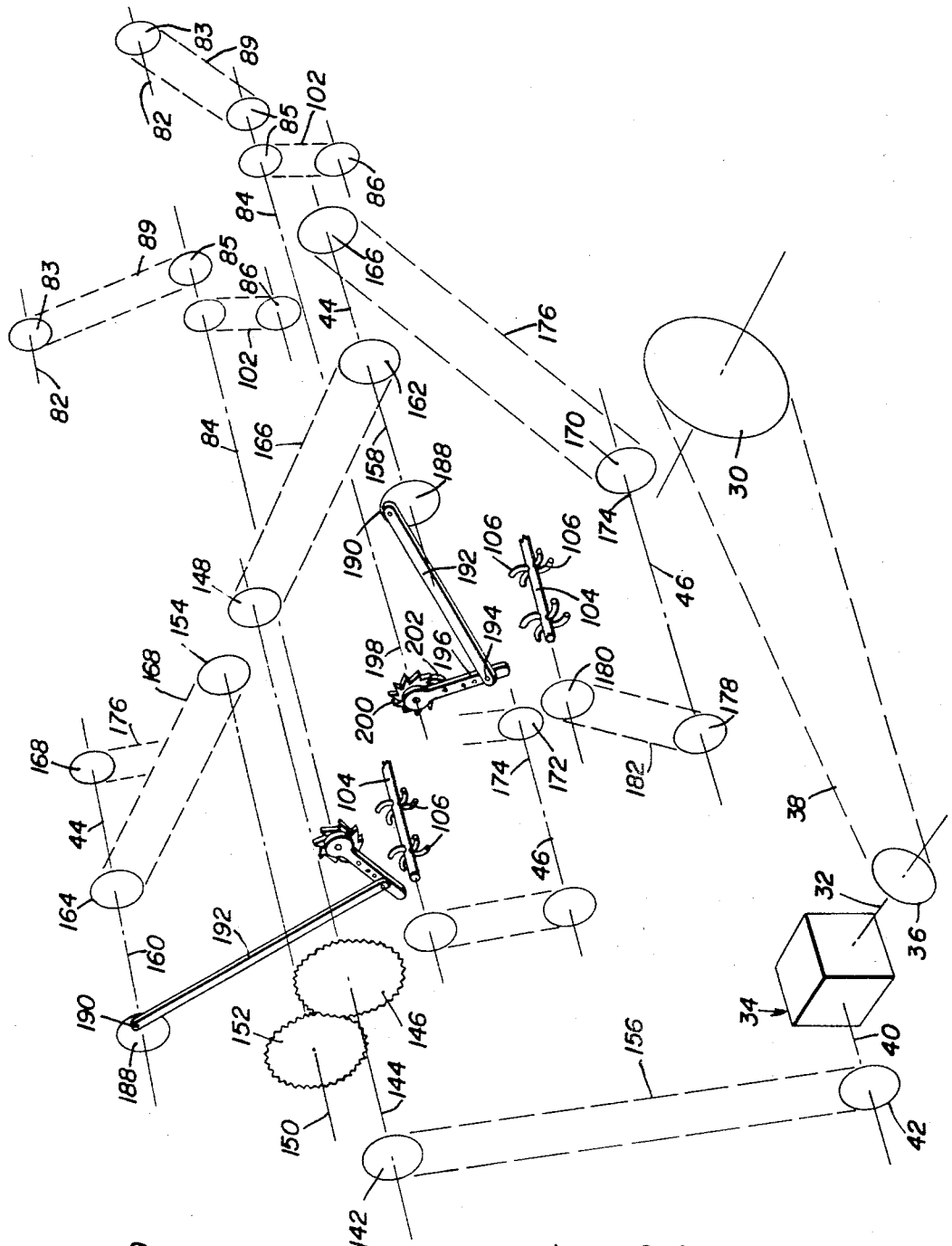
FIGURE 9 is a perspective diagrammatical view of the drive train for the various movable components of the stalks processing machine of the instant invention.

With attention now invited more specifically to FIGURES 2 and 9 of the drawings, the sprocket wheel 42 is aligned with a sprocket wheel 142 mounted on a shaft 144 journalled on the front of the receptacle 16. The shaft 144 includes a large gear wheel 146 and a rearwardly disposed sprocket wheel 148. In addition, the front of the receptacle 16 also has a shaft 150 journalled thereon provided with a gear wheel 152 meshed with the gear wheel 146. Further, the shaft 150 also includes a sprocket wheel 154 corresponding to the sprocket wheel 148. The sprocket wheel 42 is drivingly connected to the sprocket wheel 142 by means of an endless flexible chain 156 and therefore the shaft 40 drives both the shafts 144 and 150 and therefore the sprocket wheels 148 and 154.

The front of the receptacle 16 also has a pair of shafts 158 and 160 journalled thereon including sprocket wheels 162 and 164 aligned with the sprocket wheels 148 and 154 and driven from the latter by means of endless flexible chains 166 and 168. The shafts 158 and 160 comprise forward extensions of the shafts 44 and therefore drive the chains 54 and therefore the endless sheets 56 supported therefrom. Further, the rear ends of the shafts 44 are provided with sprocket wheels 166 and 168 aligned with sprocket wheels 170 and 172 carried by rearward extensions 174 of the shafts 46 whereby the rear ends of the shafts 44 drive the rear ends of the shafts 46 through endless chains 176 entrained about each pair of sprocket wheels 166 and 170. In addition, the front ends of the shafts 46 are provided with sprocket wheels 178 aligned with sprocket wheels 180 carried by the shafts 104 and endless chains 182 are entrained about each pair of sprocket wheels 178 and 180 whereby the forward ends of the shafts 46 drive the forward ends of the shafts 104.

The forward end of the shaft 62 projects forwardly through the front of the receptacle 16 and includes a noncircular end portion 186 for driving from a power take-off. In addition, each of the gear wheels 162 has a plate 188 secured thereto for rotation therewith and provided with an eccentric pin 190 on which there is journalled one end portion of a connecting rod 192. The other end of each connecting rod 192 is pivotally secured as at 194 to the free end of a corresponding crank arm 196 journalled on the forward extension 198 of the corresponding shaft 184. The extensions 198 each have a ratchet wheel 200 mounted thereon and each of the crank arms or levers 196 is provided with a ratchet dog 202 for intermittently advancing the corresponding ratchet wheel 200 in response to oscillation of the associated lever 196. Therefore, rotation of the shafts 44 will cause intermittent rotation of the shafts 84. Of course, in the modification illustrated in FIGURE 6, the shafts 82″, 84″, and 86″, are merely substituted for the shafts 82, 84 and 86 and therefore rotation of the shafts 44 would cause intermittent rotation of the shafts 82″, 84″ and 86″.

In operation, the cane stalks to be cut are placed within the receptacle 16. All moving portions of the invention are driven from the gear reduction assembly 34 except for the shaft 62 which is adapted to be driven directly from a power takeoff shaft of the towing vehicle. Accordingly, movement of the receptacle 16 will cause the shafts 82, 84 and 86 or the shafts 82″, 84″ and 86″ to intermittently rotate whereby the teeth or projections 91″ and 98 will frictionally engage and intermittently advance the stalks to be cut downwardly toward the throat 26 and then through the latter into engagement with the circular saw blades 64. As the cut stalks pass downwardly between the blades 64, they are engaged by the fingers 106 of the rotating shafts 104 and thereby extracted from between the blades 64 and discharged into the areas 78 where they remain until such time as one of the pockets or recesses 60 becomes registered with the lowermost extremity of the corresponding area 78 and the cut section of sugar cane falls into the pocket 60 and is subsequently conveyed upwardly and outwardly to the corresponding side of the receptacle 16 for discharge between the corresponding canvas curtains 110 and 112 and down into the chute or trough 108 supported therefrom. The lower ends of the troughs 108 may be raised and lowered by rotating the winding member 132 and may be adjusted laterally of the longitudinal centerline of the receptacle 16 by means of the positioning levers 118. However, the intermittently moving teeth or projections 91″ and 98 serve to accomplish the basic improved operation of this invention over the invention disclosed in my prior U.S. Patent No. 2,841,103.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalent may be resorted to, falling within the scope of the invention as claimed.

What is claimed as new is as follows:

1. A stalk processing machine comprising an elongated receptacle including upstanding opposite side walls adapted to receive therebetween stalks to be processed, said side walls being spaced apart at their lower ends to define a throat area for processing stalks and for discharge of processed stalks from said receptacle, a plurality of cutting means carried by said receptacle, including at least portions thereof disposed in and spaced along said throat area and operative to form cuts, in material forced through said throat, extending between said side walls, and conveying means supported from said receptacle and at least partially projecting into said throat area and operative to frictionally engage and advance stalks disposed in said receptacle above said cutting means downwardly into said throat and into engagement with said cutting means, said conveying means including stalk engaging means for engaging and intermittently advancing stalks engaged thereby downwardly into said throat.

2. The combination of claim 1 wherein said cutting means includes a plurality of continuously rotatable rotary cutter members disposed at least partially in said throat and journalled for rotation about axes extending longitudinally of said receptacle, said rotary cutter members comprising circular saw blades, said axes being generally centered between said side walls, said receptacle including divider means centrally disposed in said throat and operative to guide stalks moving downwardly through said throat on opposite sides of said axes.

3. The combination of claim 2 wherein said conveyor means includes portions thereof disposed on opposite sides of said divider means for advancing stalks disposed on both sides of said divider means.

4. The combination of claim 1 wherein said cutting means includes a plurality of continuously rotatable rotary cutter members disposed at least partially in said throat and journalled for rotation about axes extending longitudinally of said receptacle.

5. The combination of claim 4 wherein said rotary cutter members comprise circular saw blades.

6. The combination of claim 1 wherein said receptacle includes divider means centrally disposed in said throat and operative to divide the flow of stalks moving downwardly in said receptacle and through said throat into two separate streams disposed on opposite sides of an upstanding plane centrally disposed in said throat.

7. The combination of claim 6 wherein said conveyor means includes portions thereof disposed on opposite sides of said divider means for advancing stalks disposed on both sides of said divider means.

8. The combination of claim 1 wherein said conveying means includes an endless flexible member disposed between the transverse vertical planes containing each pair of adjacent cutting means including longitudinally movable reaches thereof extending down along one of said side walls and partially down into said throat, said endless flexible member including outwardly projecting members adapted to engage said stalks and advance the latter down into said throat.

9. The combination of claim 8 including drive means for said endless flexible member operable to intermittently advance the latter.

10. A stalk processing machine comprising an elongated receptacle including upstanding opposite side walls adapted to receive therebetween stalks to be processed, said side walls being spaced apart at their lower ends to define a throat area for processing stalks and for discharge of processed stalks from said receptacle, a plurality of cutting means carried by said receptacle, including at least portions thereof disposed in said spaced along said throat area and operative to form cuts, in material forced through said throat, extending between said side walls, and conveying means supported from said receptacle and at least partially projecting into said throat area and operative to frictionally engage and advance stalks disposed in said receptacle above said cutting means downwardly into said throat and into engagement with said cutting means, said conveying means including a pair of crankshafts journalled from at least one of said side walls for rotation about horizontal axes extending longitudinally of said receptacle and spaced apart along the vertical extent of the corresponding side wall, said crankshafts including laterally aligned eccentric throws disposed between the transverse vertical planes containing each pair of adjacent cutting means, and an elongated member having its opposite ends journalled on each pair of aligned throws and including stalk engaging projections operable through an opening formed in the corresponding side wall with which said elongated member is registered.

11. The combination of claim 1 wherein said machine includes conveyor means operable to receive stalks cut in said throat from the lower end of the latter and convey said cut stalks upwardly and outwardly to one side of said receptacle.

12. The combination of claim 11 wherein said machine includes articulated rearwardly and downwardly inclined chute means operable to receive cut stalks from said conveyor means and discharge the cut stalks rearwardly and downwardly to the ground on which said machine is disposed.

13. The combination of claim 12 including means for raising and lowering the rear lower end of said chute means.

14. A stalk processing machine comprising an elongated receptacle including upstanding opposite side walls adapted to receive therebetween stalks to be processed, said side walls being spaced apart at their lower ends to define a throat area for processing stalks and for discharge of processed stalks from said receptacle, a plurality of cutting means carried by said receptacle, including at least portions thereof disposed in and spaced along said throat area and operative to form cuts, in material forced through said throat, extending between said side walls, and conveying means supported from said receptacle and at least partially projecting into said throat area and operative to frictionally engage and advance stalks disposed in said receptacle above said cutting means downwardly into said throat and into engagement with said cutting means, said machine including conveyor means operable to receive stalks cut in said throat from the lower end of the latter and convey said cut stalks outwardly to one side of said receptacle, said machine including articulated rearwardly and downwardly inclined chute means to whose upper ends said conveyor means is operable to convey said cut stalks and for discharging the cut stalks rearwardly and downwardly along said chute means to the ground on which said machine is disposed, the upper end of said chute means being supported from said machine for shifting of the lower end of said chute means laterally of said machine, and means supported from said machine and connected to said chute means operable to laterally adjust and retain the lower end of said chute means in adjusted position.

15. The combination of claim 14 wherein the upper end of said chute means is also supported from said machine for upward and downward swinging of the lower rear end of said chute means, and means supported from said machine and connected to said chute means operable to raise and lower the rear lower end of said chute means.

16. The combination of claim 10 wherein said machine includes conveyor means operable to receive stalks cut in said throat from the lower end of the latter and convey said cut stalks upwardly and outwardly to one side of said receptacle, said cutting means including a plurality of rotary cutter members disposed at least partially in said throat and journalled for rotation about axes extending longitudinally of said receptacle.

17. The combination of claim 16 wherein said rotary cutter members comprise circular saw blades.

18. The combination of claim 1 wherein said conveying means includes an endless flexible member disposed between the transverse vertical planes containing each pair of adjacent cutting means including longitudinally movable reaches thereof extending down along one of said side walls and partially down into said throat, said endless flexible member including outwardly projecting members adapted to engage said stalks and advance the latter down into said throat, drive means for said endless flexible member operable to intermittently advance the latter, said cutting means including a plurality of rotary cutter members disposed at least partially in said throat and journalled for rotation about axes extending longitudinally of said receptacle.

19. The combination of claim 18 wherein said rotary cutter members comprise circular saw blades.

20. The combination of claim 14 wherein said machine includes a pair of opposite side articulated rearwardly and downwardly inclined chute means to whose upper ends said conveyor means is operable to convey said cut stalks, the upper ends of both of said chute means being supported from said machine for shifting of the lower ends of the chute means laterally of the machine and said means supported from said machine and connected to said chute means being operable to laterally adjust and retain the lower ends of both of said chute means in adjusted position.

References Cited
UNITED STATES PATENTS

| | | | |
|---|---|---|---|
| 411,803 | 10/1889 | Galland | 130—27 |
| 1,785,743 | 12/1930 | Morgan | 146—122 |
| 2,522,320 | 9/1950 | Totten | 146—117 X |
| 2,544,275 | 3/1951 | Moragne | 47—1 |
| 2,621,461 | 12/1952 | Tiedtke. | |
| 2,841,103 | 7/1958 | Arceneaux | 146—122 |

W. GRAYDON ABERCROMBIE, *Primary Examiner.*

U.S. Cl. X.R.

111—3; 146—57, 123